(12) United States Patent
Wood

(10) Patent No.: US 7,991,598 B1
(45) Date of Patent: Aug. 2, 2011

(54) METHOD AND SYSTEM FOR MODELING A MECHANICAL SYSTEM

(75) Inventor: Giles D. Wood, Shere (GB)

(73) Assignee: The MathWorks, Inc., Natick, MA (US)

( * ) Notice: Subject to any disclaimer, the term of this patent is extended or adjusted under 35 U.S.C. 154(b) by 1264 days.

(21) Appl. No.: 11/195,208

(22) Filed: Aug. 1, 2005

(51) Int. Cl.
G06F 17/50 (2006.01)
G06F 19/00 (2006.01)

(52) U.S. Cl. .................... 703/7; 703/1; 700/98; 702/33; 702/41

(58) Field of Classification Search .................. 703/1, 2, 703/7; 700/98; 702/33, 41
See application file for complete search history.

(56) References Cited

U.S. PATENT DOCUMENTS 4,479,196 A * 10/1984 Ferrer et al. .................. 707/100
2003/0115037 A1* 6/2003 Sumida .......................... 703/22

OTHER PUBLICATIONS

Mathworks, "Simulink, Dynamic System Simulation for Matlab", "Using Simulink" Version 3, Copyright 1990-1999 by the Math Works Inc. 605 pages.*

Rajarishi Sinha, Christiaan J.J. Paredis, Pradeep K. Khosla, "Kinematics Support for Design and Simulation of Mechatronic Systems", IFIP Conference Proceedings; vol. 207, pp. 183-198, Year of Publication: 2000, ISBN:0-7923-7619-6, 14 pages.*
C. J. J. Paredis, A. Diaz-Calderon, R. Sinha, P.K. Khosla, "Composable Models for Simulation-Based Design", Engineering with Computers (2001), pp. 112-128.*
Vei-Chung Liang, Christiaan J.J. Paredis, "A Port Ontology for Automated Model Composition" Proceedings of the 2003 Winter Simulation Conference, pp. 613-622.*
Elmqvist, Hilding, et al., "Real-time Simulation of Detailed Automotive Models," *Prodeedings of the 3rd International Modelica Conference*, http://www.Modelica.org/Conference2003/papers.shtml (2003).

* cited by examiner

*Primary Examiner* — Dwin M Craig
(74) *Attorney, Agent, or Firm* — Nelson Mullins Riley & Scarborough LLP

(57) ABSTRACT

A system and methods are disclosed herein for modeling a mechanical system having body elements movable in at least two dimensions in a graphical modeling environment. The system and methods described herein allow constraints on body elements movable in at least two dimensions in the mechanical system to be generalized and represented by a single block in the graphical modeling environment. The system and methods described herein simplify the modeling of a mechanical system by allowing a user to construct a definition of generalized constraints through a connectivity table. Thus, it is possible to model a mechanical system in a graphical modeling environment with less than all the body elements represented by blocks in a graphical model.

51 Claims, 11 Drawing Sheets

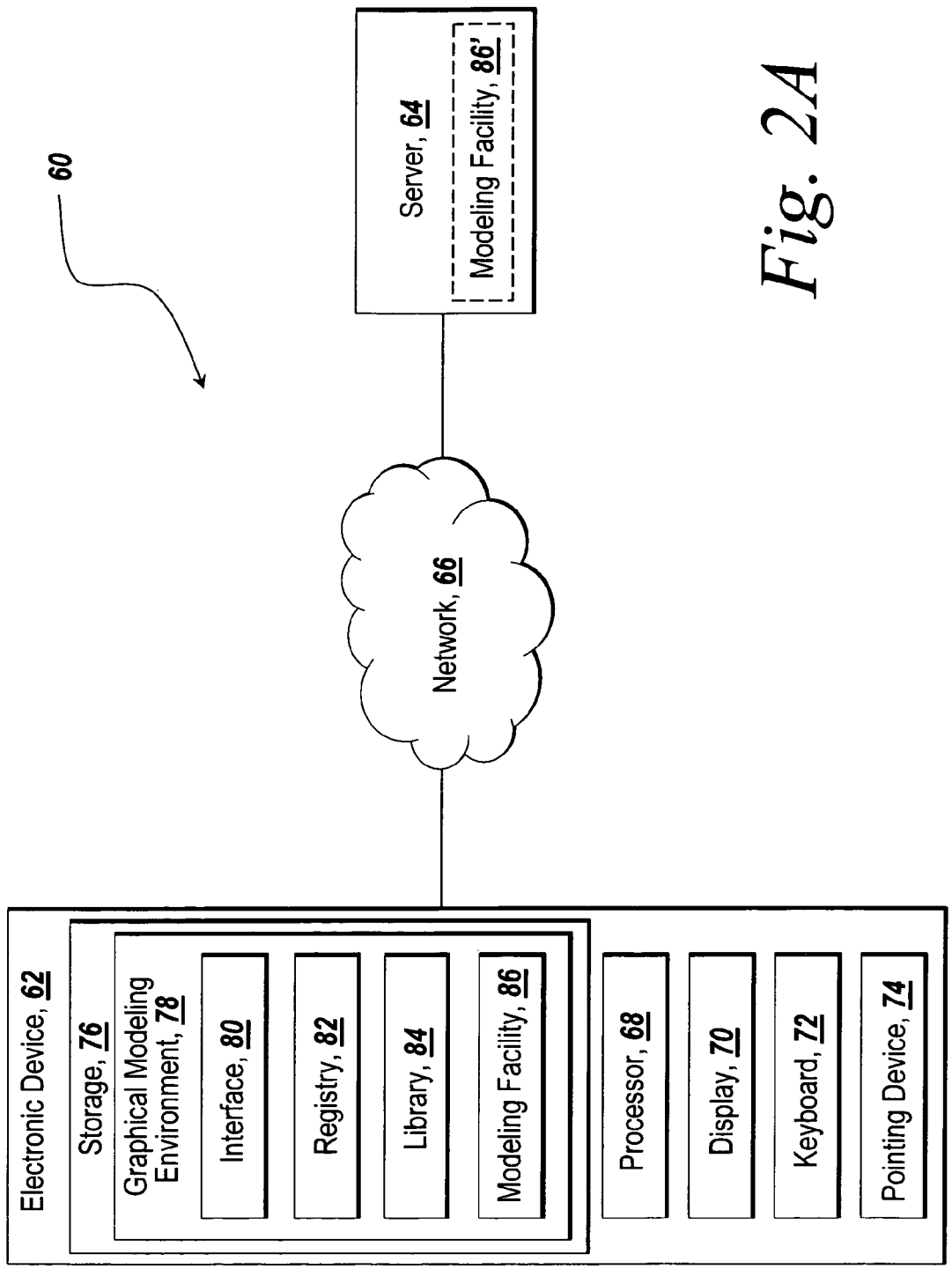

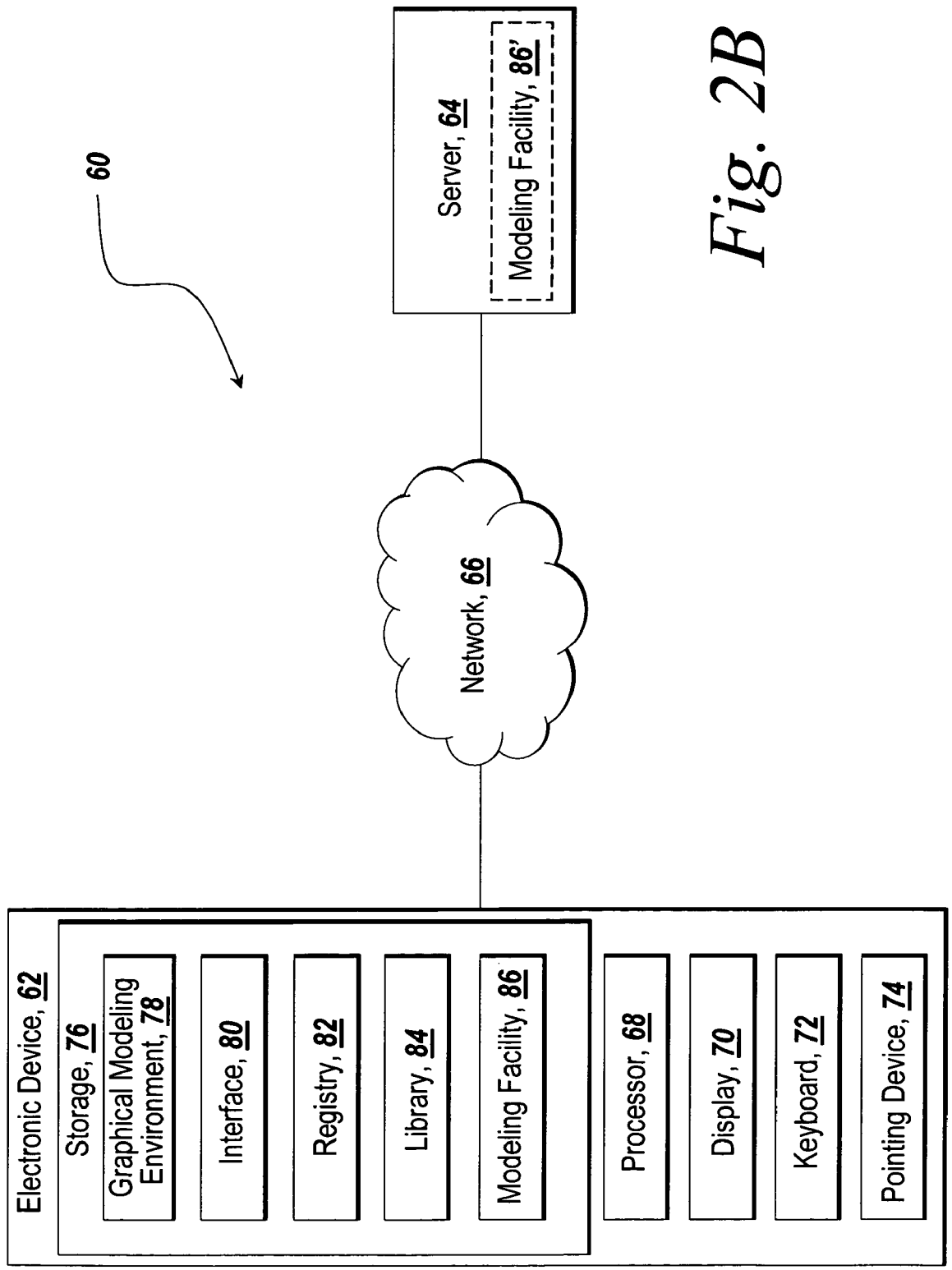

700

|  | $C$ | $R_1$ | $S_1$ | $S_2$ | $P_1$ | $P_2$ |
|---|---|---|---|---|---|---|
| $C$ | • | | | | | |
| $R_1$ | × | • | | | | $\dfrac{N_{P_2}}{N_{R_1}}$ |
| $S_1$ | × | × | • | | $\dfrac{N_{P_1}}{N_{S_1}}$ | |
| $S_2$ | × | × | × | • | | $\dfrac{N_{P_2}}{N_{S_2}}$ |
| $P_1$ | × | × | × | × | | $\dfrac{N_{P_2}}{N_{P_1}}$ |
| $P_2$ | × | × | × | × | × | |

*Fig. 7*

METHOD AND SYSTEM FOR MODELING A MECHANICAL SYSTEM

TECHNICAL FIELD OF THE INVENTION

The present invention generally relates to modeling of dynamic systems and, more particularly, to modeling of a dynamic mechanical system in a graphical modeling environment.

BACKGROUND

Various classes of graphical models describe computations that can be performed on computational hardware, such as a computer, microcontroller, FPGA, and custom hardware. Classes of such graphical models include time-based block diagrams such as those found within Simulink® from The MathWorks, Inc. of Natick, Mass., state-based and flow diagrams, such as those found within Stateflow® from The MathWorks, Inc. of Natick, Mass., data-flow diagrams, circuit diagrams, and software diagrams, such as those found in the Unified Modeling Language, for example, UML available from object management group (OMG). A common characteristic among these various forms of graphical models is that they define semantics on how to execute the graphical syntax of the model.

Historically, engineers and scientists have utilized graphical models in numerous scientific areas such as Feedback Control Theory and Signal Processing to study, design, debug, and refine dynamic systems. Dynamic systems, which are characterized by the fact that their behaviors change over time, or the fact that their states change or the fact that their behaviors change due to a system environment, are representative of many real-world systems. Graphical modeling has become particularly attractive over the last few years with the advent of software packages such as Simulink® from The MathWorks, Inc. of Natick, Mass. Such packages provide sophisticated software platforms with a rich suite of support tools that makes the analysis and design of dynamic systems efficient, methodical, and cost-effective.

A dynamic system, either natural or man-made, is a system whose response at any given time is a function of its input stimuli, its current state, the current time, and other input parameters. Such systems range from simple to highly complex systems. Physical dynamic systems include a falling body, the rotation of the earth, bio-mechanical systems (muscles, joints, etc.), bio-chemical systems (gene expression, protein pathways), weather and climate pattern systems, etc. Examples of man-made or engineered dynamic systems include: a bouncing ball, a spring with a mass tied on an end, automobiles, airplanes, control systems in major appliances, communication networks, audio signal processing, nuclear reactors, a stock market, etc.

Professionals from diverse areas such as engineering, science, education, and economics build graphical models of dynamic systems in order to better understand system behavior as it changes with the progression of time. The graphical models aid in building "better" systems, where "better" may be defined in terms of a variety of performance measures such as quality, time-to-market, cost, speed, size, power consumption, robustness, etc. The graphical models also aid in analyzing, debugging and repairing existing systems (be it the human body or the anti-lock braking system in a car). The models may also serve an educational purpose of educating others on the basic principles governing physical systems. The models and results are often used as a scientific communication medium between humans. The term "model-based design" is used to refer to the use of graphical models in the development, analysis, and validation of dynamic systems.

Graphical modeling environments such as Simulink® and various modeling tools associated with Simulink® such as, SimMechanics and SimDriveline, assist in simplifying the process of designing, simulating, and implementing dynamic systems. A graphical model is a representation of a real-world system. The graphical representation of a dynamic system often consists of a graph containing nodes (i.e. blocks) interconnected by arcs (i.e. lines). The blocks may be functional entities that perform mathematical operations, transformations or both on the data and information being processed by the system.

Planetary gear sets form a critical part of modern automatic transmission systems. One conventional approach to modeling such mechanical systems is to construct a block diagram model having a one to one mapping between the body elements of the physical system and the blocks or elements in a block diagram representation of the mechanical system. Conventionally, each body element in the mechanical system must be present in the graphical model representation. That is, conventional modeling environments require a user to faithfully model each of the body elements forming the mechanical system in the block diagram representation. Failure to include a block in the block diagram representation for each body element of the mechanical system being modeled often results in a model prematurely halting and failing to accurately model the dynamic behavior of the mechanical system. There accordingly exists a need in the art for improving the modeling and simulation of physical systems in a graphical modeling environment.

SUMMARY OF THE INVENTION

The present invention addresses the above described limitations of modeling a physical system in a graphical modeling environment. A system and methods are described herein that provide an approach to modeling a physical system in a graphical modeling environment using a generalization of constraints imposed on the physical system. In one embodiment of the present invention the generalized constraints are represented in the graphical model by a single constraint block. The constraint block is configurable to add or remove ports as desired by the creator or user of a graphical model. In this manner, the user of the model can add or remove body elements of the physical system at will by adding or removing ports to the single constraint block as necessary and accurately model the dynamic behavior of the mechanical system with less than all of the body elements represented by blocks in the graphical model.

In one illustrative embodiment of the present invention, a method for modeling a mechanical system in a computational device providing a graphical modeling environment is disclosed. The method includes steps of representing a first body element of mass of the mechanical system with a first block type in the graphical modeling environment, representing a second body element of mass of the mechanical system with the first block type in the graphical modeling environment, and representing a third body element of mass of the mechanical system with the first block type in the graphical modeling environment. The method includes the step of representing with a second block type one or more possible constraints on body motions between each of the body elements of mass relative to one another. Each of the selected body elements has the capability to move in two or more dimensions. The mechanical system can include a planetary gearset.

The second block type includes at least three ports. A first of the ports being associated with the first block type representing the first body element in the graphical model, a second of the ports being associated with the first block type representing the second body element, and a third of the ports being associated with the first block type representing the third body element.

The one or more possible constraints on body motions include constraints on the allowed relative motions amongst the selected body elements. The constraints can include kinematic constraints and dynamic constraints.

In another illustrative embodiment of the present invention a device readable medium holding device readable instructions for modeling a mechanical system having body elements movable in at least two dimensions in a computational device providing a graphical modeling environment is disclosed. Execution of the instructions causes the device to represent a first body element of mass of the mechanical system with a first block type in the graphical modeling environment. The first body element being capable of moving in at least two dimension. Execution of the instructions causes the device to represent a second body element of mass of the mechanical system with the first block type in the graphical modeling environment. The second body element being capable of moving in at least two dimensions. Execution of the instructions causes the device to represent a third body element of mass of the mechanical system with the first block type in the graphical modeling environment. The third body element being capable of moving in at least two dimensions. Execution of the instructions by the device causes the device to represent with a second block type one or more possible body motion constraints between each of the body elements relative to one another.

The second block type includes at least three ports, a first of the ports being associated with the first block type representing the first body element in the graphical model, a second of the ports being associated with the first block type representing the second body element, and a third of the ports being associated with the first block type representing the third body element. The one or more possible body motion constraints can include constraints on degrees of freedom between respective related body elements. Further, the one or more possible body motion constraints can include constraints on the allowed relative motions amongst the body elements. The constraints can include kinematic constraints and dynamic constraints.

In one embodiment of the present invention, the mechanical system includes a planetary gearset.

In one embodiment of the present invention, a computational device for use in practicing a graphical modeling environment is disclosed. The graphical modeling environment is well suited for developing and performing engineering and scientific related functions. The computational device includes an input device for use by a user and a modeling facility responsive to inputs from the user. The modeling facility in response to inputs from the user represents a first body element of mass of a mechanical system with a first block type in the graphical modeling environment; represents a second body element of mass of the mechanical system with the first block type in the graphical modeling environment; represents a third body element of mass of the mechanical system with the first block type in the graphical modeling environment; and represents with a second block type one or more possible body motion constraints between each of the body elements relative to one another.

The first, second and third body element are each capable of moving in at least two dimensions. The second block type includes at least three ports, a first of the ports being associated with the first block type representing the first body element in the graphical model, a second of the ports being associated with the first block type representing the second body element, and a third of the ports being associated with the first block type representing the third body element.

The one or more possible body motion constraints can include constraints on degrees of freedom between respective related body elements. The one or more possible body motion constraints can include constraints on the allowed relative motions amongst the body elements. The constraints can include kinematic constraints and dynamic constraints.

In one embodiment of the present invention, the constraints are represented by one or more hyperedges.

In one embodiment, the computational device further includes a display device for viewing the graphically renderable block.

In one embodiment, the mechanical system includes a planetary gearset.

In another embodiment of the present invention, a method performed in a computational device providing a graphical modeling environment is disclosed. The method models a mechanical system having body elements movable in at least two dimensions. The method includes the steps of specifying a constraint between multiple body elements of a mechanical system suitable for modeling in the graphical modeling environment and specifying a plurality of degrees of freedom defining relative motion between each respectively related body element of the mechanical system suitable for modeling in the graphical modeling environment. Each of the multiple body elements is movable in at least two dimensions. The computational device in response to the steps of specifying generates at least a portion of a model in the graphical modeling environment suitable for modeling the mechanical system. The model having one graphically renderable block representing the constraint.

The computational device in response to the steps of specifying generates at least a portion of a model in the graphical modeling environment suitable for modeling the mechanical system, the model having one graphically renderable block representing at least one degree of freedom between two of the body elements of the mechanical system with a second graphically renderable block representing the degree of freedom from the plurality of degrees of freedom.

The mechanical system can include a planetary gearset.

The constraint represents one or more restrictions among the plurality of degrees of freedom. Further, the constraint can include a restriction on the allowed relative motions amongst the body elements. Any of the constraints can include a kinematic constraint or a dynamic constraint. The constraint is representable by one or more hyperedges.

In one embodiment of the present invention, a device readable medium holding device readable instructions for modeling a mechanical system having body elements movable in at least two dimensions is disclosed. Execution of the instructions allows a constraint between multiple body elements of a mechanical system suitable for modeling in the graphical modeling environment to be specified. Each of the multiple body elements is movable in at least two dimensions. Execution of the instructions allow a plurality of degrees of freedom defining relative motion between each respectively related body element of the mechanical system suitable for modeling in the graphical modeling environment to be specified. The computational device in response to the instructions for specifying the constraint and degrees of freedom generates at least a portion of a model in the graphical modeling environment suitable for modeling the mechanical system. The model having one graphically renderable block representing the constraint.

Further, the computational device in response to the instructions for specifying the constraint and degrees of freedom generates at least a portion of a model in the graphical modeling environment suitable for modeling the mechanical system. The model having one graphically renderable block representing at least one degree of freedom between two of the body elements of the mechanical system with a second graphically renderable block representing the degree of freedom from the plurality of degrees of freedom.

The constraint can represent one or more restrictions among the plurality of degrees of freedom. The constraint can include a restriction on the allowed relative motions amongst the body elements. The constraint can include a kinematic constraint or a dynamic constraint. The constraint can be represented by one or more hyperedges.

The mechanical system can include a planetary gearset.

In another embodiment of the present invention, a computational device for use in practicing a graphical modeling environment is disclosed. The graphical modeling environment is well suited for developing and performing engineering and scientific related functions. The computational device includes an input device for use by a user and a modeling facility responsive to inputs from the user. The inputs from the user specify a constraint between multiple body elements of a mechanical system suitable for modeling in the graphical modeling environment and specify a plurality of degrees of freedom defining relative motion between each respectively related body element of the mechanical system suitable for modeling in the graphical modeling environment. Each of the multiple body elements is movable in at least two dimensions. The modeling facility in response to the inputs from the user generates at least a portion of a model in the graphical modeling environment suitable for modeling the mechanical system, the model having one graphically renderable block representing the constraint.

The constraint represents a restriction among degrees of freedom between respective related body elements. The constraint can also include a restriction on the allowed relative motions amongst respective related body elements. The constraint can include a kinematic constraint or a dynamic constraint. The constraint is representable by one or more hyperedges.

The computational device can include a display device for viewing the graphically renderable block. The mechanical system can include a planetary gearset.

In another embodiment of the present invention, a method performed in a computational device providing a graphical modeling environment is disclosed. Performance of the method models a physical system. The method includes the steps of selecting a block type representing one or more possible restrictions on variables between at least two elements relative to one another, changing a number of ports on the selected block type, and automatically changing a set of constraint equations associated with the selected block type to reflect the change in the number of ports. The method can include the step of representing the selected block type in the model with the changed number of ports.

In one embodiment, the physical system includes a mechanical system, which can be a planetary gearset. The one or more possible restrictions on the variables can include constraints on a degree of freedom between respective related body elements of the mechanical system. Further, the one or more possible restrictions on the variables can include constraints on the allowed relative motions amongst the selected body elements. The restrictions can include kinematic constraints and can include dynamic constraints.

In one embodiment of the present invention, a device readable medium holding device readable instructions for modeling a physical system is disclosed. Execution of the instructions allows for the selection of a block type representing one or more possible restrictions on variables between at least two elements relative to one another and allows for changing a number of ports on the selected block type. In turn, execution of the instructions automatically changes a set of constraint equations associated with the selected block type to reflect the change in the number of ports.

Execution of the instructions can cause the device to represent the selected block type in the model with the changed number of ports.

The physical system can include a mechanical system, which can include a planetary gearset.

The one or more possible restrictions on the variables can include constraints on a degree of freedom between respective related body elements of the mechanical system. Further, the one or more possible restrictions on the degrees of freedom can include constraints on the allowed relative motions amongst the related body elements. The restrictions can include kinematic constraints and include dynamic constraints.

In another embodiment of the present invention, a computational device for use in practicing a graphical modeling environment is disclosed. The graphical modeling environment is well suited for developing and performing engineering and scientific related functions. The computational device includes an input device for use by a user, and a modeling facility responsive to inputs from the user. The inputs from the user cause a change in a number of ports on a block type representing one or more possible restrictions on variables between at least two elements forming a portion of a physical system and cause an automatic change to a set of constraint equations associated with the block type to reflect the change in the number of ports. The modeling facility in response to the inputs from the user changes a graphical representation of the block type to reflect the change in the number of ports and the set of constraint equations.

The computational device can include a display device for viewing the graphically renderable block.

The physical system can include a mechanical system, which can include a planetary gearset.

The one or more possible restrictions on the variables can include constraints on a degree of freedom between respective related body elements of the mechanical system. The one or more possible restrictions on the degree of freedom can include constraints on the allowed relative motions amongst the related body elements. The restrictions can include kinematic constraints and include dynamic constraints.

BRIEF DESCRIPTION OF FIGURES

An illustrative embodiment of the present invention will be described below relative to the following drawings in which like reference characters refer to the same parts throughout the different views.

FIG. 2A illustrates an environment suitable for practicing the illustrative embodiment of the present invention.

FIG. 2B illustrates another environment suitable for practicing the illustrative embodiment of the present invention.

FIG. 7 is a Table identifying connectivity constraints of the body elements forming the Ravigneaux wheelset illustrated in FIG. 3.

DETAILED DESCRIPTION

The present invention provides systems and methods to generalize constraints in or on a physical system and represent the generalized constraints in a single aspect of a graphical model. In one illustrative embodiment of the present invention, the generalization of the constraints is achieved by defining a data structure holding representations of selected body elements in the mechanical system having the ability to move in two or more dimensions. From the data structure an implementation of the block is derived to represent the constraints of concern in the graphical modeling environment.

A graphical model of a dynamic system often takes the form of a time-based block diagram. Such a time-based block diagram model is represented schematically as a collection of blocks interconnected by lines that are either visible on a display (i.e., graphical connection), by lines that are not visually displayed, or both. Signals correspond to the time-varying quantities represented by each line connection and are assumed to have values at each time instant. The lines represent the connection as opposed to the signals themselves. Each block represents an elemental dynamic system. A line emanating at one block and terminating at another can signify that the output of the first block is an input to the second block that an output of the second block is an input to the first block, or a bi-directional signal between a bi-directional port of the first block and a bi-directional port of the second block. Each distinct input or output on a block is referred to as a port.

Figure 1:
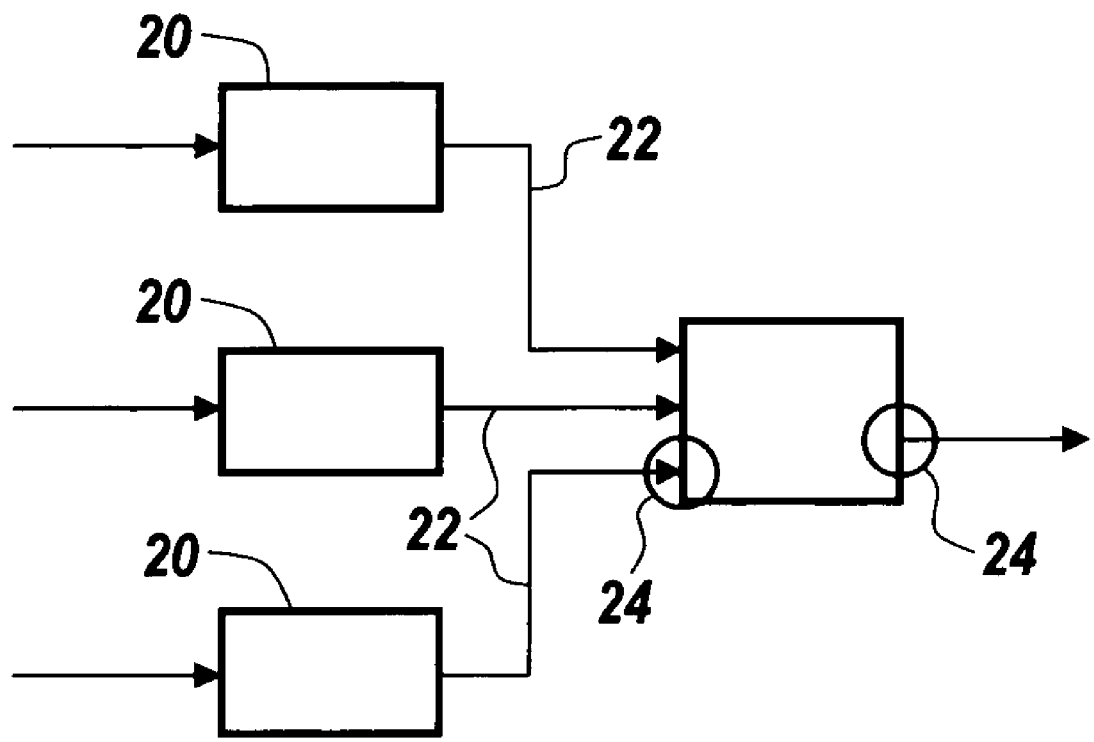
FIG. 1 illustrates components of an exemplary graphical model environment.

The source block of a signal writes to the signal at a given time instant when its system equations are solved. The destination blocks of this signal read from the signal when their system equations are being solved. FIG. 1 illustrates exemplary components of a time-based block diagram model in a graphical modeling environment. The time-based block diagram model includes a plurality of blocks 20, lines 22 and ports 24 that are interconnected. Those skilled in the art will recognize that the term "blocks" does not refer exclusively to elemental dynamic systems but may also include other modeling elements that aid in readability and modularity of graphical models.

The generation or creation of the graphical model illustrated in FIG. 1 is accomplished, for example, using system 60 illustrated in FIG. 2A. System 60 includes an electronic device 62, a network 66, and optionally, another electronic device for example server 64. Electronic device 62 includes, amongst other hardware and software components, graphical user interface (GUI) tools 80 and modeling tool 86 in graphical modeling environment 78. One example of a graphical model environment is Simulink® from The MathWorks, Inc. of Natick, Mass. The suite of GUI tools allows users to draft a graphical model on one or more corresponding windows. The GUI tools 80 can include a block palette, wiring line connection tool (i.e. signal connector tool), annotation tool, formatting tool, attribute editing tool, save/load tool and publishing tool, and other tools depending on a user's need and the graphical modeling environment 78.

The block palette is a library 84 of pre-defined blocks available to the user when building or editing a block diagram model. Individual users may be able to customize this palette to: (a) reorganize blocks in some custom format, (b) delete blocks they do not use, and (c) add custom blocks they have designed. The palette allows blocks to be dragged through some human-machine interface (such as a pointing device 74 or keyboard 72) from the palette on to the window (i.e., model canvas). The graphical version of the block that is rendered on the canvas is called the icon for the block. There may be different embodiments for the block palette including a tree-based browser view of all of the blocks. Further details of system 60 are discussed below in more detail with reference to FIG. 2B.

The wiring line connection tool (not shown) allows users to draw directed lines representing signals that connects the ports of blocks in the model's window. Lines may also be added through various mechanisms involving human-machine interfaces such as a mouse or a keyboard. Simulink® also provides various forms of auto-connection tools that connect blocks automatically on user request to produce an aesthetically pleasing layout of the graphical model (especially those with high complexity with large numbers of blocks). The annotation tool allows users to add notes and annotations to various parts of the palette for a graphical model. The formatting tool enables users to perform various formatting operations that are generally available on any document editing tool. These operations help pick and modify the various graphical attributes of the graphical model (and constituent blocks) such as include font-selection, alignment & justification, color selection, etc.

The graphical model and all the entities within the graphical model generally have a set of functional attributes that are relevant for the execution of the model and code-generation from the model for execution by a computational hardware device outside the graphical modeling environment. The attribute editing tool provides GUIs that allow these attributes to be specified and edited. The save/load tool allows a created graphical model to be saved. The saved model can be reopened in the editor at some later juncture through a load mechanism. Simulink® also allows users to save blocks including pre-constructed subsystems into a separate class of block diagrams called libraries. Such libraries facilitate reuse of the same block in a number of other block diagrams. The load/save mechanism is specially equipped to handle loading and saving of blocks in a block diagram that actually reside in libraries.

A typical base class for a block that can be used in time-based block diagrams may be represented as:
class Block {
public:
    // Access methods for setting/getting block data
    ...
    // Methods for block editing
    virtual ErrorStatus BlockDrawIcon( )
    virtual BlockParameterData BlockGetParameterData( );
    ...
    // Methods for block compilation
    ...
    // Methods for block execution
    ...
    virtual ErrorStatus BlockOutput( )=0;
    virtual ErrorStatus BlockDerivative( )=0;
    virtual ErrorStatus BlockUpdate( )=0;
    ...
private:
    BlockGraphicalData blkGraphicalAttributes;
    BlockFunctionalData blkFunctionalAttributes;
    BlockCompiledData blkCompiledAttributes;
    BlockExecutionData blkExecutionData;
    ...;
};

Although the example of the data structure above is written in C++, those skilled in the art will recognize that equivalent data structures written in other languages, such as a structured language or another object oriented language may also be used. The major data fields of the block data structure fall into four categories. For example, a graphical attributes field, a functional attributes field, a compiled attributes field and an execution data field.

The graphical attributes field is responsible for storing information relevant for graphical rendering of the block within its parent graphical model's GUI. Attributes specific to the block icon such as font, color, name, and icon-image are stored in this field. It should be noted that modifying these attributes does not affect the dynamics of the model using this block. The functional attributes field is responsible for specifying block attributes that may potentially affect the dynamics of the model using this block. These attributes are specified for the block as a whole and the input and output ports of the block. Examples of block attributes include block sample times and restrictive flags. Block sample times specify if the block corresponds to an elemental, continuous, discrete, or hybrid dynamic system. If the block is an elemental discrete-time system, then the attribute specifies the spacing between time instants at which the block response should be traced. A restrictive flag disallows the use of blocks in certain modeling contexts. For example, one may impose the restriction that there may only be one instance of a given block in a model.

Attributes of block ports specify properties of the information that is either available to or produced at that port. For example, Block port attributes are listed in Table I below.

TABLE I

| Dimensions |
| Data Types |
| Sample Rates |
| Direct Feed Through |
| Complexity |

Dimension attributes are individual dimension sizes of a multi-dimensional array that are used as a container for data elements. Data type attributes are the data type of each element of data in the data container. A complexity attribute is a flag to specify if each data element is real or complex. A sample rate attribute specifies how and when the signal corresponding to an input or output port will be used. The port sample times may sometimes be used to implicitly infer the block's sample time. The direct feed through attribute may be specified only for input ports and indicates whether the Output, the GetTimeOfNextHit, or both equations of the block are a function of the given input. This attribute helps in determining the sequence in which block methods should be executed while executing the graphical model.

The compiled attributes field of the block data structure holds the attributes of the block and its ports that mirror the functional attributes listed above. This field is filled in during graphical model compilation by utilizing the functional attributes of the block in conjunction with the functional and compiled attributes of the blocks that are connected to it. This process of determining the compiled attributes from the functional attributes is termed attribute propagation or signal propagation. The execution data field is mainly responsible for storing the memory locations that are going to serve as sources for block inputs, outputs, states, parameters, and other work areas during execution of blocks.

The block data structure also has a set of associated methods that may be categorized as access methods to data fields, methods used in editing, methods used in compilation and methods used in execution. Access methods to data fields help in setting and getting the various data fields of the block. Methods used in editing are called by the graphical model editor in order to render the block appropriately in the GUI of its parent block diagram model. For instance, this set of methods may include a BlockDrawIcon method that determines the shape the block icon has on the GUI. Methods used in compilation are methods that are called by the block diagram model compilation engine. They help validate the connections of the block to other blocks on the block diagram model.

The methods used in execution include a number of different run-time methods that are required for execution. These include the BlockOutput, BlockUpdate, BlockDerivative methods that realize the Output, Update, and Derivative equations often found in the context of dynamic systems. In addition, to these methods Simulink® includes several other run-time methods, such as the Jacobian, Projection, ZeroCrossings, Enable, Disable, Initialize, EvalParams (check and process parameters), and GetTimeOfNextHit methods. It should be noted that there is no explicit method for algebraic equations because these are represented and processed in a different manner.

Once a graphical model has been constructed using the editor, an execution engine may allow the model to be solved in order to trace the system outputs as a function of time. The solution of the model, which may be referred to as model execution or simulation, is carried out over a certain time span for a set of user-specified inputs. Simulation proceeds in four major stages: compilation, link, code generation, and the simulation loop.

FIG. 2B illustrates an environment suitable for practicing an illustrative embodiment of the present invention. A computer system 60 includes an electronic device 62 connected to a network 66, such as the Internet, an intranet, or other suitable network either wired, wireless or a hybrid of wired and wireless, and, optionally, a server 64 or other electronic device. The electronic device 62 includes a microprocessor 68 for executing various instructions from an executable program and controlling various hardware and software components. The electronic device 62 also includes a display device 70 for use in rendering textual and graphical images, a storage device 76 for storing various items such as an interface 80, modeling tool 86, and a graphical modeling environment 78.

The storage device 76 can also store a registry 82 for registering various properties or characteristics of blocks and signals with the graphical modeling environment 78, and a library 84 to serve as a repository of block types and signal types that currently exist in the graphical modeling environment 78. The registry 82 in conjunction with the interface 80 allows a user to register with the graphical modeling environment 78 signals and blocks customized or created by the user or signals and blocks imported into the graphical modeling environment 78. Those skilled in the art will appreciate that the illustration of the interface 80, the registry 82, the library 84 and the modeling tool 86, is merely illustrative and these elements can be physically or logically located in the graphical modeling environment 78.

In an exemplary embodiment, the graphical modeling environment 78, such as a graphical modeling environment like Simulink® from the MathWorks, Inc. of Natick, Mass., provides a graphical and interactive environment by which engineers and other designers can use a model-based design approach to design and model the behavior of a mechanical system. With a model-based design approach, the graphical modeling environment 78 allows a block diagram model to be an implementation specification for a controller for mechanical systems such as, automotive and aerospace transmission systems. As such, design changes to the model can be quickly updated in the design model, evaluated by simulation and then automatically reflected in the controller.

The graphical modeling environment 78 includes the modeling tool 86 for defining mechanics of a mechanical system, simulating motion of the mechanical components, evaluating the mechanics of the mechanical system by modeling the system, and if desired, generating executable code for the implementation of the controller design represented by a block diagram model. In brief overview, the modeling tool 86, such as a modeling tool like SimMechanics or SimDriveline from the MathWorks, Inc. of Natick, Mass., generates and executes graphical models of mechanical systems in the graphical modeling environment 78, such as the graphical modeling environment 78 provided by Simulink®. The modeling tool 86 can generate source code for the model or for subsystems of the model, compile the source code into object code, and build an executable program. The code may be designed to run on any processor, microprocessor, operating system, computational hardware or component of a computational hardware. Additionally, the code may be customized to run on a specific target hardware platform.

The electronic device 62 also includes a keyboard 72 and a pointing device 74, such as a mouse, trackball, or lightpen. The graphical modeling environment 78 will be described below for illustrative purposes based on Simulink® from The MathWorks, Inc. of Natick, Mass. Nevertheless, those skilled in the art will appreciate that the principles and concepts described below are equally applicable to other graphical modeling environments, such as LabView, SystemView, Signal Processing Workstation, HyperSignal, COSSAP, Angeles, Ptolemy and other like graphical model environments.

The server 64 coupled to the network 66 is adaptable to include the modeling tool 86'. In this manner, a number of users are able to access the modeling tool 86' via the network 66 to build or generate a block diagram model representing a mechanical system. Those skilled in the art will recognize that the electronic device 62 includes other software such as other interfaces and other programs, such as one or more OS programs, compilers and various other program applications developed in a variety of programming environments for controlling system software and hardware components.

Figure 3:
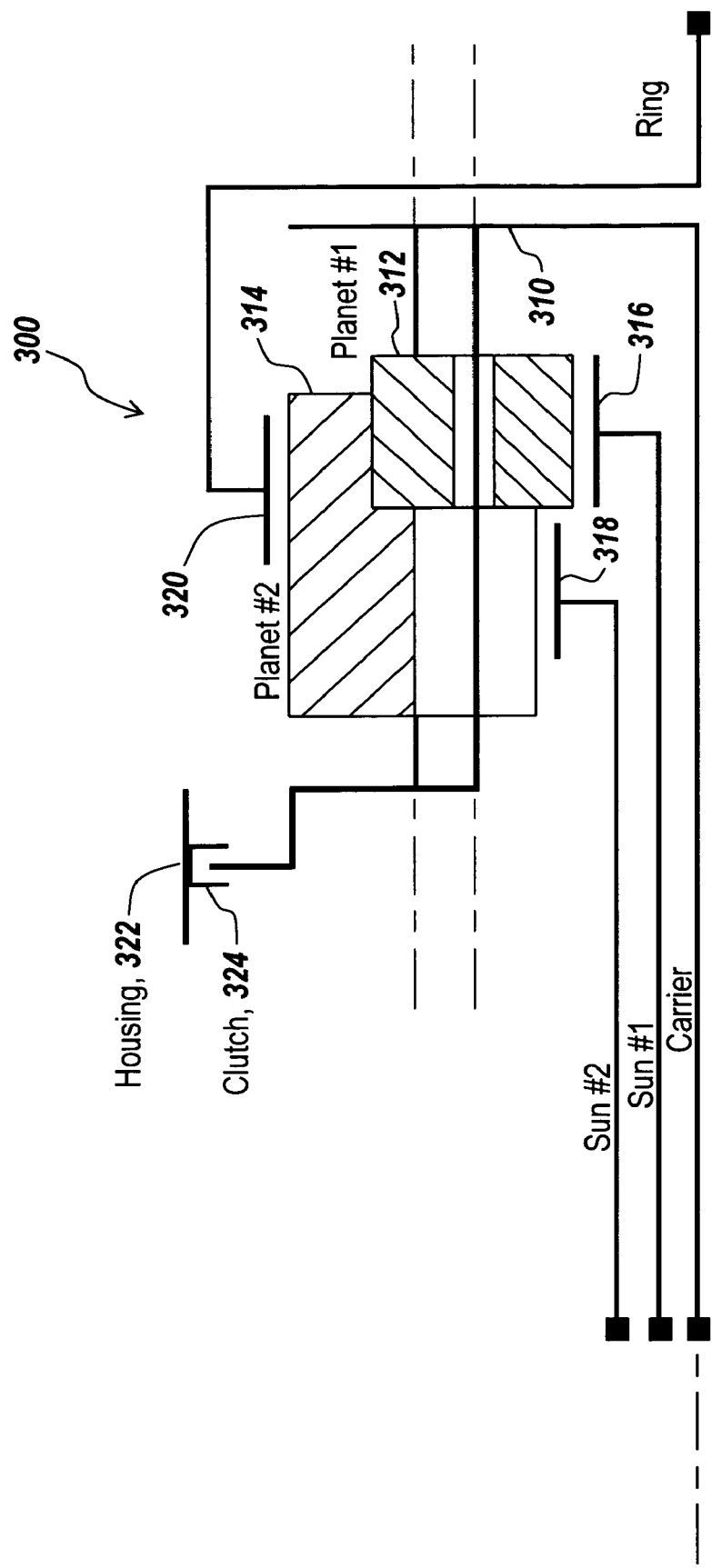
FIG. 3 illustrates a schematic diagram of a Ravigneaux wheelset suitable for modeling in accordance with the teachings of the present invention.

FIG. 3 schematically depicts an illustrative Ravigneaux wheelset. The Ravigneaux wheelset 300 is a planetary wheelset or gearset system, a common element found in automatic transmission systems for vehicles. The Ravigneaux wheelset 300 includes a housing 322 to house a carrier body 310, to which are connected a first planet gear 312 and a second planet gear 314. The two planet gears or wheels are mated through gear teeth (not shown). The Ravigneaux wheelset 300 further includes within the housing 322 a first sun gear 316 and a second sun gear 318 that mate to the first and second planet gear 312, 314 through two independent sets of gear teeth (not shown). Further, the Ravigneaux wheelset 300 includes a ring gear 320 that mates to the second planet gear 314 in the housing 322. Clutch 324 is between the housing 322 and the carrier 310. The Ravigneaux wheelset 300 has two degrees of freedom.

Figure 3A:
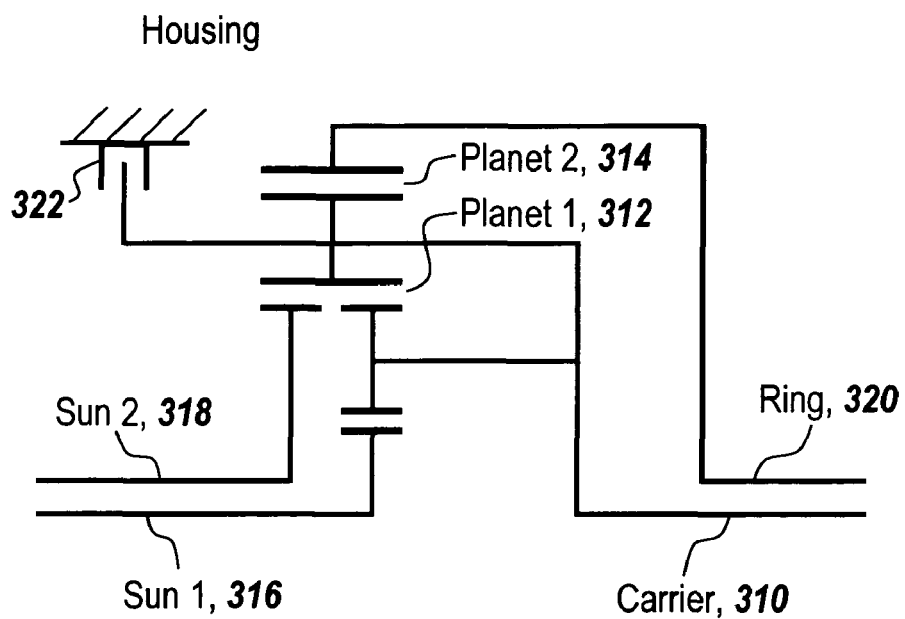
FIG. 3A illustrates an alternative side view of the schematic diagram of the Ravigneaux wheelset suitable for modeling in accordance with the teachings of the present invention illustrated in FIG. 3.
Figure 3B:
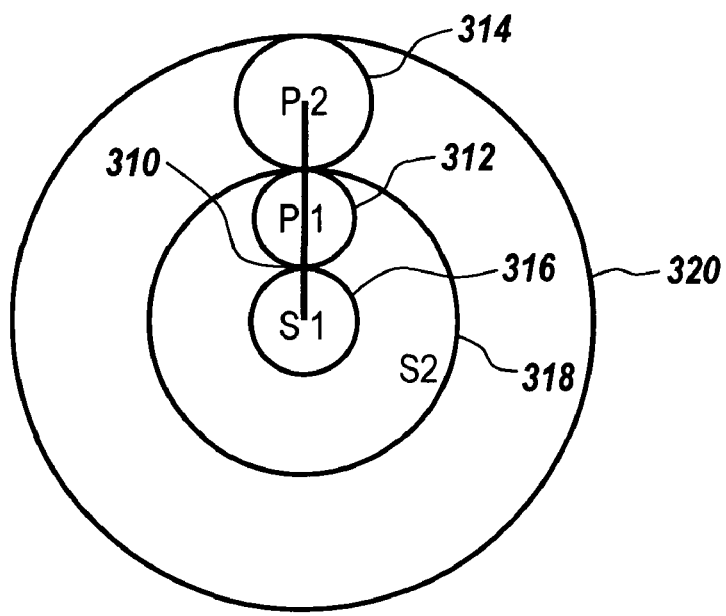
FIG. 3B illustrates a front view schematic diagram with the various gears of the Ravigneaux wheelset aligned along a single axis.
Figure 3C:
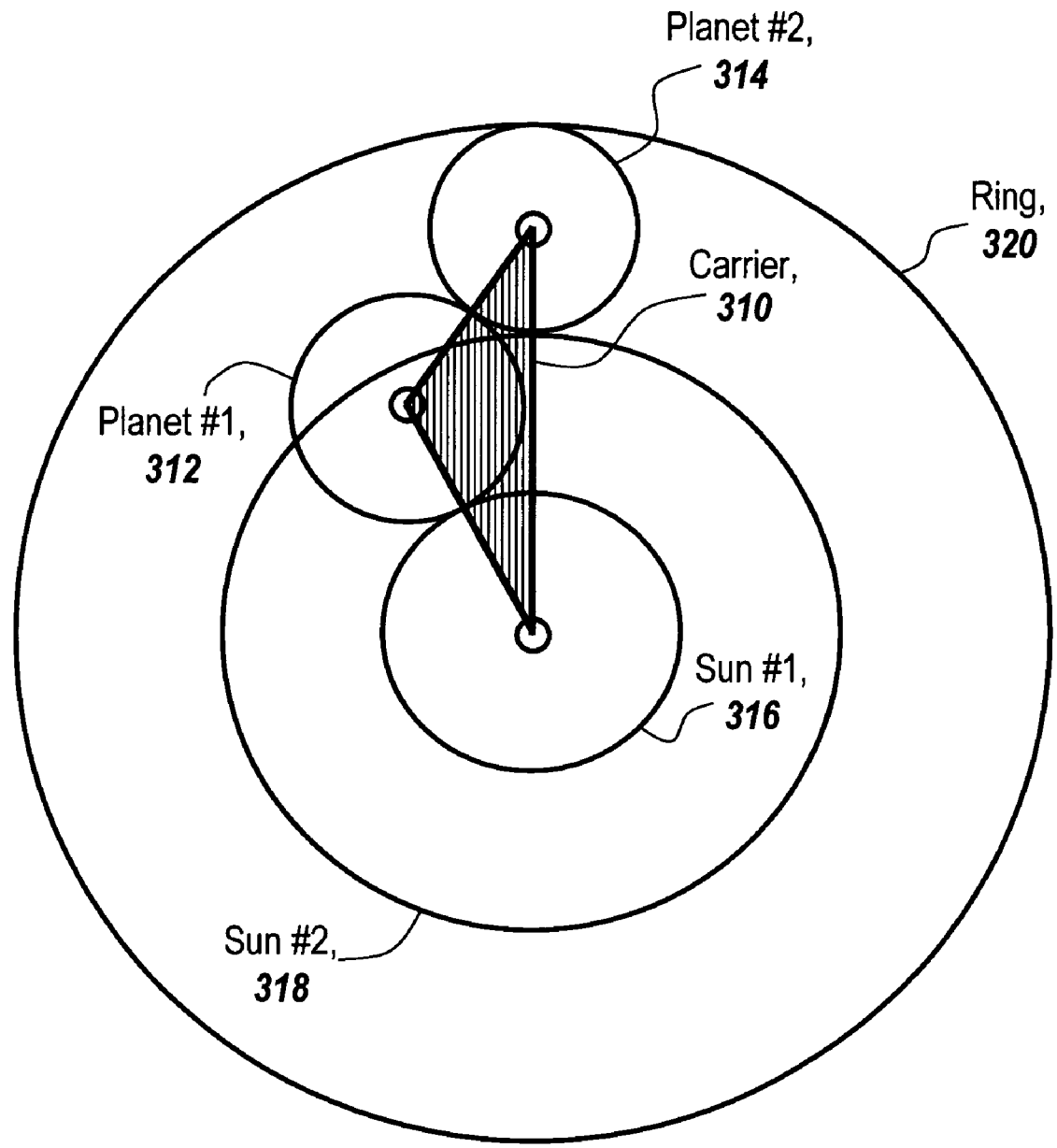
FIG. 3C illustrates another front view schematic diagram of the Ravigneaux wheelset illustrated in FIG. 3 suitable for modeling in accordance with the teachings of the present invention.

FIGS. 3A, 3B, and 3C illustrate alternate views of the Ravigneaux wheelset 300 illustrated in FIG. 3. The alternative views illustrated in FIGS. 3A-3C are meant to facilitate the understanding of the structure of a Ravigneaux wheelset along with the relationship of the various gears forming a Ravigneaux wheelset.

Before continuing below it is first helpful to define a few terms used herein.

As used herein the term "degree of freedom" refers to a single coordinate of relative motion between two bodies. Such a coordinate is free only if it can respond without restriction or impose motion to externally applied forces or torques. For translation motion, a degree of freedom is a linear coordinate along a single direction. For rotational motion, a degree of freedom is an angular coordinate about a single axis.

As used herein the term "constraint" refers to a restriction among degrees of freedom of a system in a model of a mechanical machine this constraint is imposed independently of any applied forces or torques. A constraint removes one or more independent degrees of freedom, unless that constraint is redundant and restricts degrees of freedom that otherwise could not move anyway. Constraints can be kinematic, that is they must involve only coordinates or velocities or derivatives of these variables. The kinematic constraints do not involve mass, inertia, forces, or torques. The constraint equations involving accelerations need to be simultaneously solved with the Newtonian laws of motion. The relationship specified by a constraint can be an explicit function of time or not. In addition to kinematic constraints derived from the geometry of a machine that constrain positions, velocities and other intensive variables, dynamic constraints can be captured in a similar manner. Dynamic constraints are constraints on the forces, torques of mechanical components and other extensive variables. For example, modeling two or more friction points of a body sliding on a surface may require a force balance on the forces of each of the friction points. Another form of a dynamic constraint exists when two elastic elements are connected such that their forces are directly related. For example, a spring that is connected to another spring on one end requires the forces that each of the springs exert to be the same. This constraint is the dual of a rigid connection between two masses. In a more sophisticated configuration, the end of one spring may be connected to the end of another spring by means of a lever.

As used herein the term "body element" refers to the basic element of a mechanical system or machine. A body element is characterized by its mass properties (mass and inertia tensor), its position and orientation in space, and any attached body coordinate systems. Bodies are connected to one another by joints, constraints, or drivers. Bodies carry no degrees of freedom.

As used herein, the term "driver" refers to a constraint that restricts degrees of freedom as an explicit function of time and independently of all applied forces for torques. A driver removes one or more independent degrees of freedom.

As used herein, the term "joint" refers to one or more mechanical degrees of freedom between two body elements. Joints have no mass properties such as a mass or an inertia tensor. A joint primitive represents one translational or rotational degree of freedom or one spherical (three rotational degrees of freedom in an angle axis form). Prismatic and Revolute primitives have motion axis vectors.

As used herein the term "hypergraph" refers to a graph of mechanical bodies and constraints on those bodies. The nodes in the graph represent the mechanical bodies and edges and hyperedges represent joints and constraints between mechanical bodies.

As used herein the term "hyperedge" refers to a connection between three or more nodes of a hypergraph.

Figure 4:
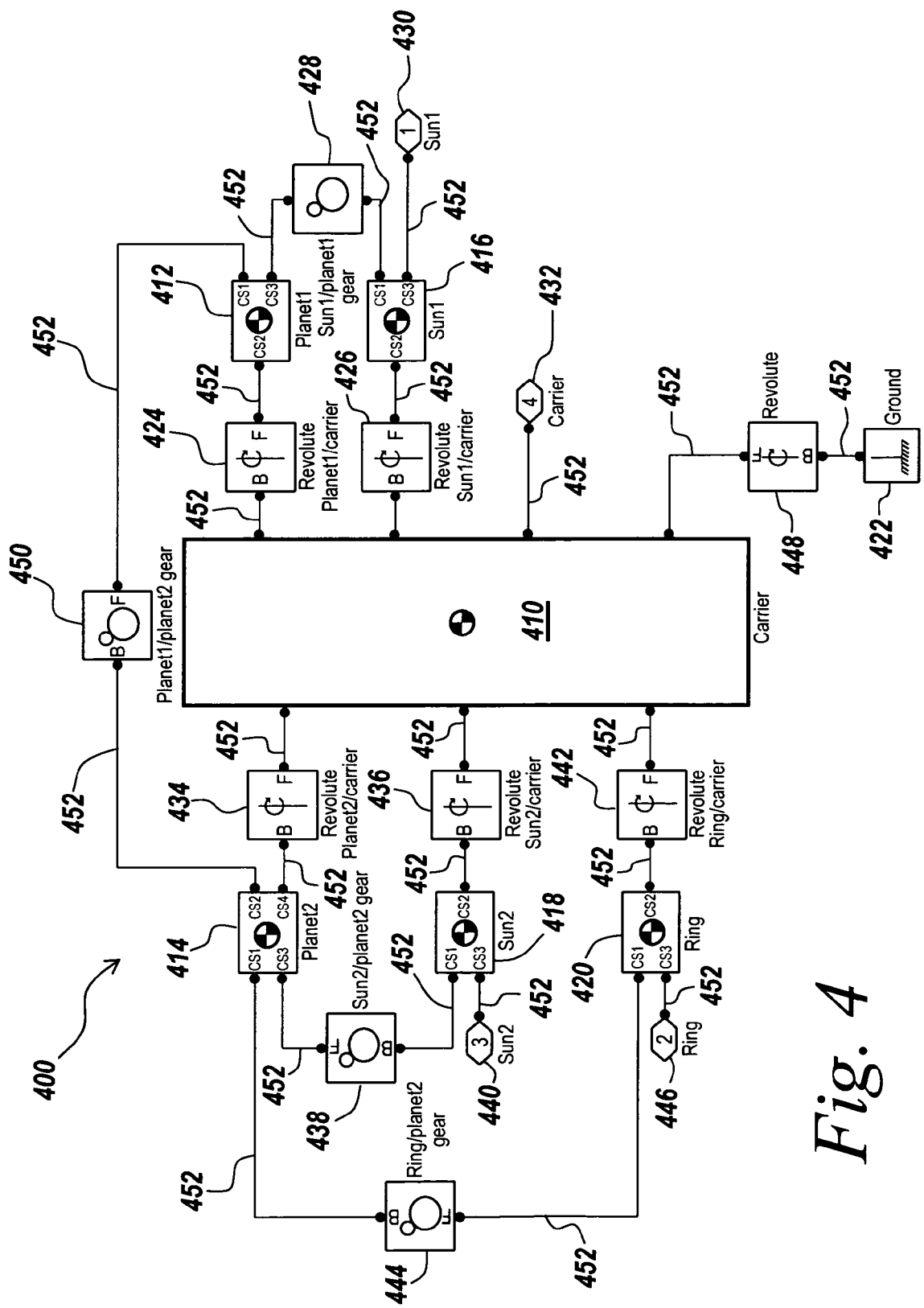
FIG. 4 depicts a prior art model in a graphical modeling environment of the Ravigneaux wheelset illustrated in FIG. 3.

FIG. 4 illustrates a prior art graphical model diagram, for example a prior art model created in SimMechanics, of the Ravigneaux wheelset 300 depicted in FIG. 3. Graphical model 400 of the Ravigneaux wheelset 300 requires a one to one mapping between the body elements of the physical system and the blocks of the graphical model representing the same. That is, each body element in a physical system is present in the graphical model 400. The graphical model 400 includes a carrier block 410, a first planet gear block 412, a second planet gear block 414, a first sun gear block 416, a second sun gear block 418, and a ring gear block 420. Each of these blocks respectively represents each of the body elements of Ravigneaux wheelset 300 depicted in FIG. 3. The carrier block 410 acts as the common reference body for each pair of element bodies connected by a two-sided gear constraint.

Modeling the physical system of FIG. 3 with a prior art modeling tool requires that the user faithfully model each of the body elements forming the physical system both topologically and geometrically. The relative positions of the body elements, the inertia properties, and the geometry of mechanical interactions between selected body elements must all be entered through the various block dialogs. In order to carry out a full three-dimensional analysis a user must create a block diagram model of the physical system that includes a block representing each body element. The prior art graphical modeling environments do not allow a user to benefit from symmetrical features of the physical model to simplify both the graphical model representation of the physical system along with the modeling, simulation, and analysis of the physical system.

The graphical model 400 further includes a joint block 424 connected between the carrier block 410 and the first planet gear block 412. The joint block 424 represents a degree of freedom between the carrier 310 and the first planet gear 312. Likewise the graphical model 400 includes a joint block 426 connected between the carrier block 410 and the first sun block 416 representing the degrees of freedom between the carrier 310 and the first planet gear 312. Interconnected between the first planet gear block 412 and the first sun block 416 is a constraint block 428. The constraint block 428 represents a restriction among the degrees of freedom between the first planet gear 312 and the first sun gear 316 and represents the constraint formed by the meshing gear teeth. The first sun gear block 416 is connected to first connection port 430 via connection line 452. First connection block 430 represents a connector port for the graphical model 400. The first connector port 430 is used to connect to other systems or subsystems.

Graphical model 400 further includes a joint block 434 connected between the second planet gear block 414 and the carrier block 410. The joint block 434 represents the degrees of freedom between the second planet gear 314 and the carrier 310. In similar fashion, a joint block 436 is coupled between the second sun block 418 and the carrier block 410 to represent the degrees of freedom between the second sun gear 318 and the carrier 310. A constraint block 438 is connected between the second planet gear block 414 and the second sun gear block 418. The constraint block 438 represents a restriction among degrees of freedom between the second planet gear 314 and the second sun gear 318. The second sun gear block 418 is connected to a third connector port 440 providing another port for connecting the graphical model 400 to another graphical subsystem or graphical system.

Connected between the second planet gear block 414 and the first planet gear block 412 is a constraint block 450. The constraint block 450 represents a restriction among the degrees of freedom imposed between the second planet gear 314 and the first planet gear 312. A constraint block 444 is connected between the second planet gear block 414 and the ring block 420. The constraint block 444 represents a restriction among degrees of freedom imposed between the second planet gear 314 and the ring gear 320. The ring block 420 is coupled to a joint block 442 which, in turn, is coupled to the carrier block 410. The joint block 442 represent degrees of freedom between the ring gear 320 and the carrier 310. The ring block 420 is also connected to a fourth connector port 446 for use in interfacing the graphical model 400 with a system or subsystem outside of the graphical model 400.

The carrier block 410 is further connected to a joint block 448, which, in turn is connected to a ground block 422. The ground block 422 represents a point fixed at rest. The joint block 448 represents degrees of freedom between the carrier 310 and the fixed point represented by the ground block 422.

In the graphical model 400 each of the blocks forming the graphical representation of the Ravigneaux wheelset 300 are interconnected by connection lines 452. The connection lines 452 serve a dual purpose in representing a transfer of torque between two body elements and enforcing angular velocity constraints between two body elements. More specifically, any connection line 452 between two ports enforces the constraint that the two components so connected rotate at the same angular velocity, if the connection line 452 connects rotating body elements. Likewise, a connection line 452 connecting two rotating body elements also transfers any torque applied to a body element at one end to the body element connected to the other end of the connection line. For example, a connection line 452 connecting two rotating body elements can represent an idealized massless and perfectly rigid spinning shaft.

Those skilled in the art will appreciate a connection line representing an idealized massless and perfectly rigid spinning shaft may be limited to selected application environments and a connection line can also represent other types of connections in other application environments. For example, in the SimDriveline environment the connection line for 452 connecting two rotating body elements is well suited to represent the idealized massless and perfectly rigid spinning shaft. However, in a different environment, for example, SimMechanics, the connection line, such as connection line similar in representation to connection line 452 represents a portion of a three-dimensional multiple body simulation and therefore does not represent an idealized massless and perfectly rigid spinning shaft. In the SimMechanics environment, a connection line can represent a physical connection and spatial relationships among the bodies represented by the blocks.

The graphical model 400 represents a faithful representation of the physical system represented by the schematic diagram of FIG. 3 and as such is burdensome for use to implementing engineering assumptions, for example, neglecting or ignoring certain forces on certain body elements. For example, if a user chooses to neglect or ignore the inertias of the first planet gear 320 and the second planet gear 314 in the graphical model 400 a likely result is a singular mass matrix, which is likely to cause the model or simulation to abort or fail. Likewise, if a user reduces the inertias of the first planet gear 320 and the second planet gear 314 in the graphical model 400 to a less than significant amount, the graphical model 400 is subject to numerical conditioning problems.

The graphical model 400 represents six degrees of freedom and four constraints leaving two global degrees of freedom, which is why one clutch must be locked to obtain a unique gear ratio in a Ravigneaux gearset. As will be discussed in more detail below, the illustrative embodiment of the present invention allows a system to be more compactly modeled, for example in this instance, a Ravigneaux wheelset represented by a graphical model having four degrees of freedom and two constraints.

Figure 5:
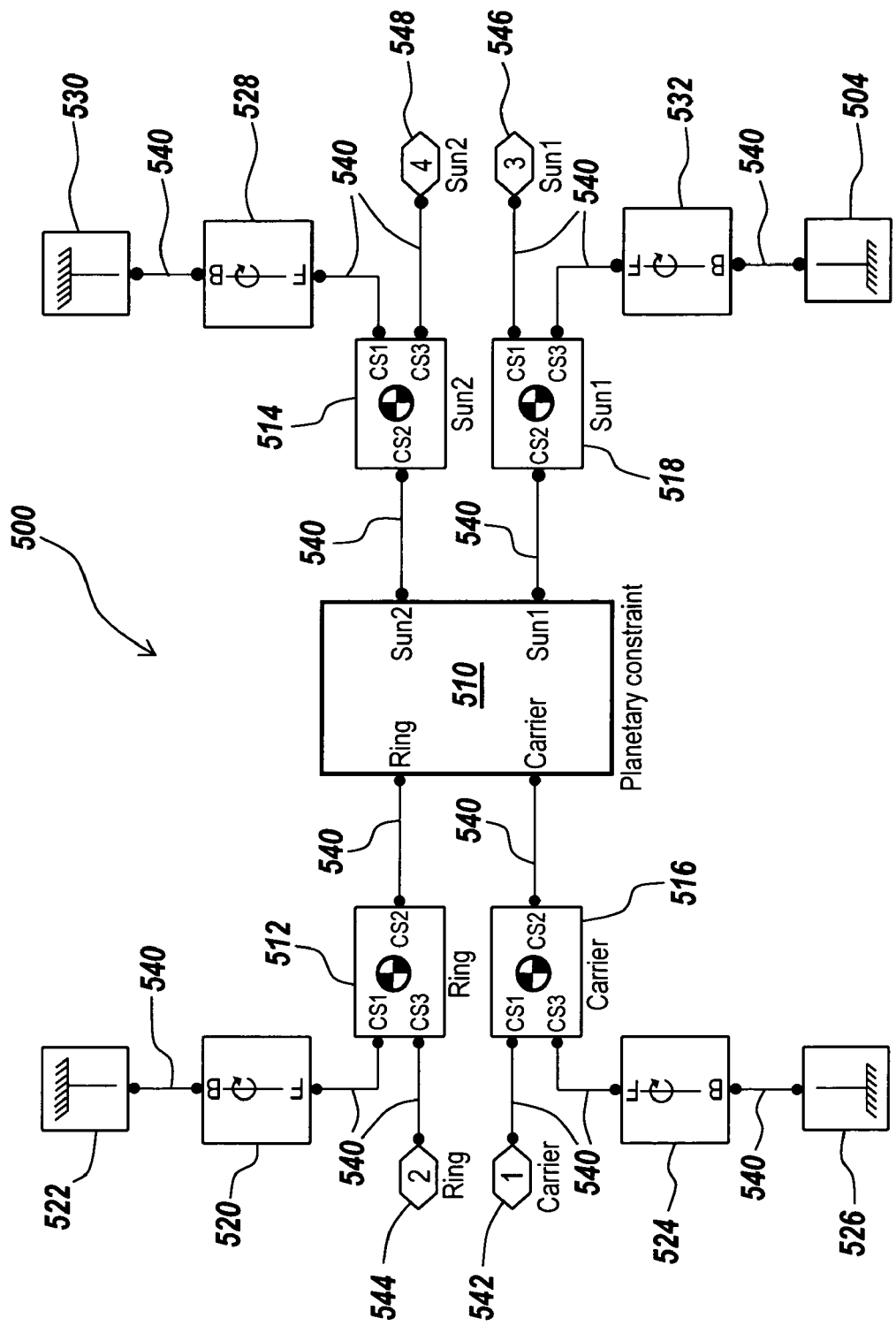
FIG. 5 depicts a model in a graphical modeling environment of the Ravigneaux wheelset in accordance with the teachings of the present invention.

FIG. 5 illustrates a graphical model of the Ravigneaux wheelset 300 illustrated in FIG. 3 according to the teachings of the present invention. Graphical model 500 represents the use of a hyperedge in representing a physical system.

The graphical model 500 includes body element blocks representing the first sun gear 316, the second sun gear 318, the ring gear 320, and the planet carrier 310 of the Ravigneaux wheelset 300 illustrated in FIG. 3. The graphical model 500 is free of body element blocks representing the first planet gear 312 and the second planet gear 314. Hence, an engineer can model the Ravigneaux wheelset 300 in the graphical modeling environment 78, ignore or neglect the inertias of the first planet gear 312 and the second planet gear 314 and avoid the burdens of trying to do so in the prior art graphical model 400.

The graphical model 500 includes a constraint block 510 connected to a ring gear block 512, a planet carrier block 516, a second sun gear block 514, and a first sun gear block 518. The ring gear block 512 represents the ring gear 320 of the Ravigneaux wheelset 300 in FIG. 3. The planet carrier block 516 represents the planet carrier 310 of the Ravigneaux wheelset 300. Likewise, the first sun gear block 518 and the second sun gear block 514 represent the first sun gear 316 and the second sun gear 318, respectively, of the Ravigneaux wheelset 300.

The ring gear block 512 is further connected to a joint block 520 which is connected to a ground block 522. The joint block 520 represents degrees of freedom between the ring gear 320 and a fixed point at rest represented by the ground block 522. The ring gear block 512 is further connected to a second connection port 544. The second connection port 544 provides a port for connection of the graphical model 500 to another subsystem or a system within the graphical modeling environment 78. The body element (e.g., the ring gear) represented by the ring gear block 512 is capable of moving in at least two dimensions.

The carrier block 516 is further connected to a joint block 524, which, in turn is connected to a ground block 526. The joint block 524 represents degrees of freedom between the carrier 310 represented by the carrier block 516 and a fixed point at rest represented by the ground block 526. The carrier block 516 includes a port to connect to a first connection port 542. The first connection port 542 provides connectivity to another subsystem or system in the graphical modeling environment 78. The body element (e.g., the carrier) represented by the carrier block 516 is capable of moving in at least two dimensions.

The second sun gear block 514 is connected to a joint block 528. The joint block 528 is connected to a ground block 530. The ground block 530 represents a fixed point at rest and the joint block 528 represents degrees of freedom between the fixed point represented by the ground block 530 and the second sun gear 318 of the Ravigneaux wheelset 300. The second sun gear block 514 represents the second sun gear 318 and includes a port to connect to a fourth connection port 548. The fourth connection port 548 provides a connection to another subsystem or system within the graphical modeling environment 78. The body element (e.g., the second sun gear) represented by the second sun gear block 514 is capable of moving in at least two dimensions.

The first sun gear block 518 represents the first sun gear 316. The first sun gear block 518 is connected to a joint block 532. The joint block 532 is connected to a ground block 534. The ground block 534 represents a fixed point at rest and the joint block 532 represents degrees of freedom between the first sun gear 316 and the fixed point. The first sun gear block 518 includes a port to connect to a third connection port 546. The third connection port 546 provides connectivity to another subsystem or system within the graphical modeling environment 78. The body element (e.g., the first sun gear) represented by the first sun gear block 518 is capable of moving in at least two dimensions.

Within the graphical model 500 each of the blocks are interconnected with connection lines 540. Each of the connection lines 540 between the various blocks represents a physical connection between body elements. The connection lines 540 do not represent signals or mathematical operations and have no inherent directionality. Each connection line 540 connected between blocks representing two moveable body elements enforces the constraint that the two moveable body elements so connected rotate at the same angular velocity. The connection line 540 also transfers any torque applied to a first rotational body element to a second rotational body element located at the other end. A connection line 540 represents an idealized massless and perfectly rigid spinning shaft between two body elements.

Those skilled in the art will appreciate a connection line representing an idealized massless and perfectly rigid spinning shaft may be limited to selected application environments and can also represent other types of connections in other application environments. For example, in the SimDriveline environment the connection line for 540 connecting two rotating body elements is well suited to represent the idealized massless and perfectly rigid spinning shaft. However, in a different environment, for example, SimMechanics the connection line similar to the connection line 540 represents a portion of a three-dimensional multiple body simulation and therefore does not represent an idealized massless and perfectly rigid spinning shaft. In the SimMechanics environment, a connection line can represent a physical connection and spatial relationships among the bodies represented by the blocks.

The graphical model 500 includes blocks representing the planet carrier 310, the ring gear 320, the first sun body 316, and the second sun body 318 of the Ravigneaux wheelset 300. The body element blocks in the graphical model 500 representing these selected body elements of the Ravigneaux wheelset 300 are included to account for the respective inertias of the selected body elements. The graphical model 500 does not include body element blocks representing the first planet gear 312 and the second planet gear 314 of the Ravigneaux wheelset 300 because the graphical model 500 allows a user of the graphical modeling environment 78 to neglect or ignore the inertias of selected body elements. However, if the inertia of a body element is important to a user, the graphical model 500 is configurable to take into account the additional forces.

More specifically, the constraint block 510 is configurable to include fewer ports or additional ports for connecting to additional body element blocks representing body elements of a mechanical system to include the additional body elements in the modeling process. The constraint block 510 represents constraint equations represented in the hyperedge. As such, the present invention allows the physical geometry of a mechanical system to be replaced by a set of constraint equations. Thus, if a user is interested in the rotational motion of a transmission employing a Ravigneaux wheelset the exact location of each body element forming the transmission does not need to be faithfully reproduced in a graphical model constructed with the modeling tool 86.

Figure 6:
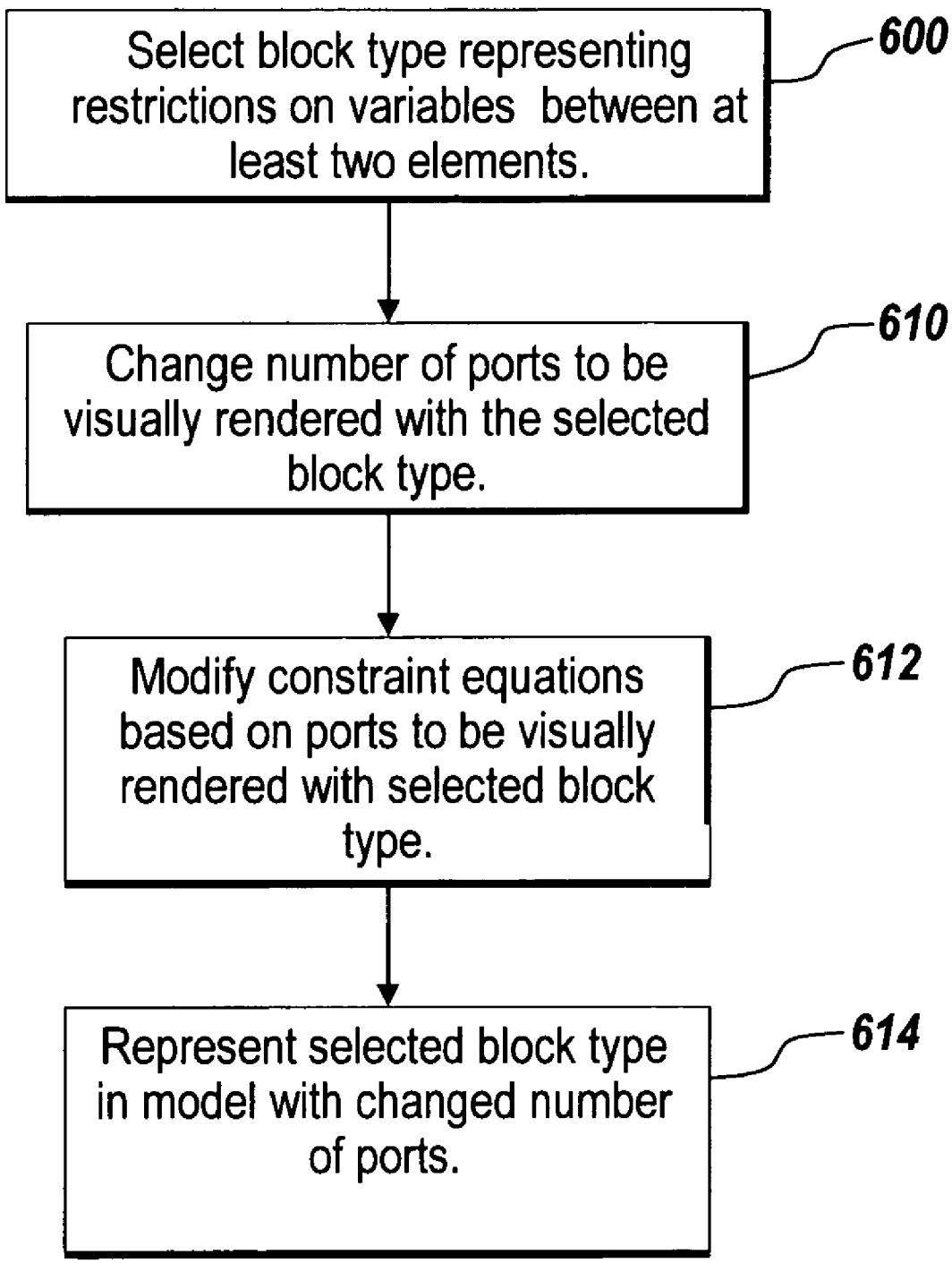
FIG. 6 depicts a graphical block flow diagram illustrating steps taken to practice an illustrative embodiment of the present invention.

FIG. 6 illustrates steps taken to configure a constraint block in accordance with the present invention to include fewer ports or additional ports. Additional ports can be added at the user's discretion to connect additional blocks representing body elements of physical system, for example, a mechanical system having body elements movable in one, two, three or more dimensions to include the additional body elements in the modeling process. Likewise, at the user's discretion, ports can be removed from the constraint block to remove blocks from the modeling process representing body elements of a physical system, for example, a mechanical system having body elements movable in one, two, or three dimensions.

As discussed herein, ports of a constraint block in accordance with the teachings of the present invention can represent physical components and constraints, and, as discussed herein, constrain variables through equations on those physical components. The ports pass information in variables. The constraint block enforces that these variables satisfy some equation. This equation can vary depending on the number of ports displayed. The planetary constraint described in relation to FIG. 7 is one example of this for a two dimensional or three dimensional physical system.

With the benefit of this disclosure and given the analogies between domains of physics, a skilled practitioner in the art will recognize how to practice the present invention in other physical domains in addition to the illustrative mechanical domain described herein. For example, kinematic constraints on velocities and positions in the mechanical domain have a direct relation to constraints on currents and charges in the electrical domain, constraints on volume flow and stored liquid in the hydraulic domain, constraints on entropy and entropy flow in the thermal domain, and the like. Similarly, dynamic constraints on forces in the mechanical domain have a direct relation to constraints on voltages in the electrical domain, constraints on pressures in the hydraulic domain, constraints on temperatures in the thermal domain, and the like.

In general, thermodynamics provides a unifying approach to dynamic systems that consist of elements with variables that determine their behavior over time. These variables can be of the intensive and extensive type, where intensive variables are those that do not change their value if the element is divided into two parts while extensive variables are those that are affected by such a division. For example, if a body of fluid is separated into two equal parts, the temperature of the two parts is the same as that of the original body of fluid. On the other hand, the fluid volume becomes half for each of the parts.

The constraints on variables associated with elements in physical systems can involve the variables directly, their derivatives with respect to time, their partial derivatives with respect to other variables, their integral over time, and the like.

As mentioned, the constraint block 510 is one exemplary embodiment of a constraint block in accordance with the teachings of the present invention and will be used in the discussion below as an illustrative example. The modification of the constraint block 510 as described below is not limited to mechanical systems having body elements movable in two or more dimensions. More specifically, the ability to modify a constraint block in real time fashion as described below is applicable to all physical systems.

In step 600, the user selects the second block type using the pointing device 74, the keyboard 72, or a combination of the two devices. The use of the pointing device 74, the keyboard 72, or the combination of the two devices allows the user to open or select a menu or other interface allowing the user to configure the block with additional or fewer ports as desired. That is, the user can reconfigure the planetary constraint block 510 during initial construction and build of a model, once a model has been built, and at any time thereafter to modify the model of the mechanical system in real time fashion without having to add an additional constraint block when adding additional body elements of the mechanical system and without having to remove a constraint block when removing body elements of the mechanical system from the model. Suitable interfaces include a graphical user interface, a command line interface, or a menu driven interface.

In step 610, the user changes the number of ports to be visually rendered with the second block type (e.g., constraint block 510) using the pointing device 74, the keyboard 72, or using a combination of the two devices via a suitable interface. In step 612, the graphical modeling environment 78 modifies the constraint equations associated with the second block type based on the number of ports to be visually rendered with the second block type. In step 614, the graphical modeling environment 78 represents the second block type to the user with the changed number of ports.

One exemplary manner in which the graphical modeling environment 78 can modify the constraint equations associated with the second block type is discussed below in relation to Equation 5. For example, the graphical modeling environment 78 can identify which ports the user has selected to visually render in the model and accordingly partition those variables representing ports to be visually rendered from variables representing those ports not to be visually rendered. The details of such an exemplary partitioning or ordering are discussed below in more detail.

The definition of the constraints represented by the constraint block 510 is achievable through a connectivity table. FIG. 7 illustrates one suitable connectivity table 700 for defining the constraint equations represented by the constraint block 510. For ease of the discussion below, the connectivity table 700 is discussed in relation to the Ravigneaux wheelset 300 illustrated in FIG. 3. Nevertheless, the discussion below is equally applicable to other mechanical systems, for example, other wheelsets such as a Simpson wheelset and other physical systems that employ planetary gears.

Figure 6A:
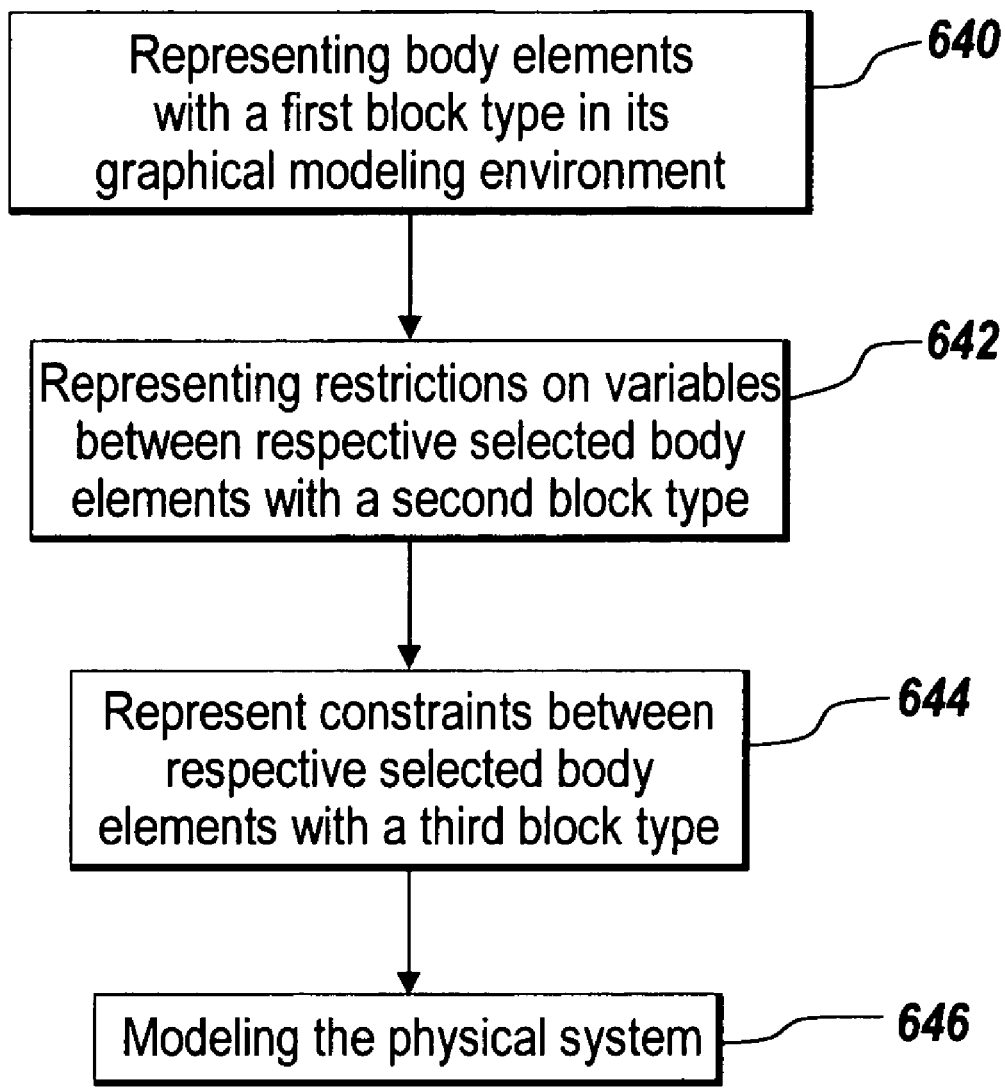
FIG. 6A depicts a graphical block flow diagram illustrating steps taken to practice another illustrative embodiment of the present invention.

FIG. 6A illustrates steps taken to practice an illustrative embodiment of the present invention. In step 640 a graphical model builder, such as modeling facility 86 or a user of a graphical model represents body elements of a physical system with a first block type in the graphical modeling environment 78. In step 642, the graphical model user or graphical model builder represents the various constraints imposed on motion between respective related body elements with a second block type in the graphical modeling environment 78. In step 644, the graphical model user or graphical model builder represents motion between respective related body elements with a third block type in the graphical modeling environment 78. In step 646, the graphical model user or graphical model builder models the mechanical system using at least three block types.

In Table 700 each planetary constraint has exactly one carrier labeled C. Table 700 can be extended with the addition of sun gears labeled $S_1, S_2, \ldots S_n$, planet gears labeled $P_1, P_2, \ldots P_n$, and ring gears labeled $R_1, R_2, \ldots R_n$. Since table 700 is symmetric the lower triangle is specified by the upper triangle. The diagonal elements of Table 700 are reserved for port representation in the graphical model 500. Thus, if a diagonal element is checked the constraint block 510 includes a connection port for a body element block representing the gear corresponding to the given row and column of the selected diagonal element. In this example the inertias of the first planet gear 312 and the second planet gear 314 are deselected to neglect or ignore the inertias of respective gear and as such, the constraint block 510 includes ports for body element blocks representing the first sun gear 316, second sun gear 318, the ring gear 320, and the planet carrier 310.

The gear mating information is given by the off diagonal terms. For example, the fact that the ring gear 320 ($R_1$) mates to the second planet 314 ($P_2$) is indicated by entering the tooth ratio of the mating gears in the row corresponding to the ring $R_1$ and the column corresponding to planet $P_2$. The tooth counts for the planet gears are given by $N_{P1}, N_{P2}, \ldots N_{Pn}$, and similarly for the sun gears 316, 318, and ring gear 320 by $N_{S1}, N_{S2}, \ldots N_{Sn}$, and $N_{R1}, N_{R2}, \ldots N_{Rn}$, respectively. Tooth ratios are preferred since they are establishable and provide a complete characterization of the kinematic constraint imposed by mating gear teeth. Consequently, the defining of the kinematic constraints imposed by the Ravigneaux transmission system 300, or for that fact any other transmission system or physical system employing a planetary gear set has been reduced to filling of a table.

From Table 700 a mathematical implementation is carried out. From the Table 700, four types of gear mating constraints are encountered. The first being the first sun gear mating with the first planet gear, the second being the second sun gear mating with the second planet gear, the third being a first planet gear mating with a second planet gear, and fourth a second planet gear mating with the ring gear. By allowing $\theta_c$, $\theta_s$, $\theta_r$, and $\theta_p$ to characterize the rotation of a generic carrier, sun, ring, and planet gear with respect to a single referenced body, the constraint equations are established in the form of equations 1-4 below:

Sun/Planet:

$$\theta_s - \left(\frac{N_S + N_P}{N_S}\right)\theta_c + \left(\frac{N_P}{N_S}\right)\theta_p = 0 \quad (1)$$

where $\theta_s$ is the sun rotation, $\theta_c$ the carrier rotation, $\theta_p$ the planet rotation. $N_S$ is the number of teeth on the sun gear and $N_P$ the number of teeth on the planet gear.

Sun/Ring:

$$\theta_r - \left(\frac{N_S}{N_R}\right)\theta_S = 0, \quad (2)$$

where $\theta_r$ is the ring gear rotation and $\theta_S$ is the sun gear rotation. NS is the number of teeth on the sun gear and NR is the number of teeth on the ring gear.

Planet/Planet:

$$\theta_c - \left(\frac{N_{P1}}{N_{P1} + N_{P2}}\right)\theta_{P1} - \left(\frac{N_{P2}}{N_{P1} + N_{P2}}\right)\theta_{P2} = 0, \quad (3)$$

where $\theta_c$ is the carrier rotation, $\theta_{P1}$ the rotation of the planet gear $P_1$ and $\theta_{P2}$ the rotation of the planet gear $P_2$.

Planet/Ring:

$$\theta_c - \left(\frac{N_P}{N_R - N_P}\right)\theta_P - \left(\frac{N_R}{N_R - N_P}\right)\theta_r = 0, \quad (4)$$

where $\theta_c$ is the rotation of the carrier, $\theta_p$ the rotation of the planet gear, and $\theta_R$ the rotation of the ring gear. $N_P$ is the number of teeth on the planet gear, and $N_R$ the number of teeth on the ring gear.

An application of these equations to the Ravigneaux gearset 300 results in the following system of equations:

$$\begin{bmatrix} -\left(1 + \frac{N_{P2}}{N_{S2}}\right) & 0 & 0 & 1 & 0 \\ -\left(1 + \frac{N_{P1}}{N_{S1}}\right) & 0 & 1 & 0 & +\left(\frac{N_{P1}}{N_{S1}}\right) \\ 1 & 0 & 0 & 0 & -\left(\frac{N_{P1}}{N_{P1} + N_{P2}}\right) \\ 1 & -\left(\frac{N_{R1}}{N_{R1} - N_{P2}}\right) & 0 & 0 & \left(\frac{N_{P2}}{N_{R1} - N_{P2}}\right) \end{bmatrix} \begin{bmatrix} \theta_c \\ \theta_{R1} \\ \theta_{S1} \\ \theta_{S2} \\ \theta_{P1} \\ \theta_{P1} \end{bmatrix} = \begin{bmatrix} 0 \\ 0 \\ 0 \\ 0 \end{bmatrix} \quad (5)$$

Here we have ordered the vector $\theta = [\theta c, \theta_{R1}, \theta_{S1}, \theta_{S2}, \theta_{P1}, \theta_{P2}]^T$ such that the rotations due to the planet gears, the gears for which there are no connectivity ports in Table 700, appear at the end of the vector. In general, for any planetary system, it is possible to order the elements in the vector $\theta$ such that the rotation angles associated with gears or wheels that have no connection ports appear at the end of the vector.

Indeed, in the general case we can partition the vector $\theta = [\theta_1, \theta_2]$, with the $\theta_1 \in R^{n1}$ containing the angles for all gear wheels that have connection ports, and $\theta_2 \in R^{n2}$ containing the angles of all gear wheels that have no connection ports. The constraint equations can then be partitioned as:

$$\begin{bmatrix} A_{11} & A_{12} \end{bmatrix} \begin{bmatrix} \theta_1 \\ \theta_2 \end{bmatrix} = [0]$$

Here $A_{11} \in R^{ne \times n1}$ and $A_{12} \in R^{ne \times n2}$ and it is further assumed that the constraint equations are independent. In the case of the Ravigneaux transmission we obtain:

$$A_{11} = \begin{bmatrix} -\left(1 + \frac{N_{P_2}}{N_{S_2}}\right) & 0 & 0 & 1 \\ -\left(1 + \frac{N_{P_1}}{N_{S_1}}\right) & 0 & 1 & 0 \\ 1 & 0 & 0 & 0 \\ 1 & -\left(\frac{N_{R_1}}{N_{R_1} - N_{P_2}}\right) & 0 & 0 \end{bmatrix}, \quad (6)$$

$$A_{12} = \begin{bmatrix} 0 & +\left(\frac{N_{P_2}}{N_{S_2}}\right) \\ +\left(\frac{N_{P_1}}{N_{S_1}}\right) & 0 \\ -\left(\frac{N_{P_1}}{N_{P_1} + N_{P_3}}\right) & -\left(\frac{N_{P_1}}{N_{P_1} + N_{P_2}}\right) \\ \left(\frac{N_{P_2}}{N_{R_1} - N_{P_2}}\right) & 0 \end{bmatrix}$$

Any gear wheels that do not have connection ports connected to them will not be associated with actual bodies in the graphical model 500 and must therefore be eliminated. A necessary and sufficient condition for this to be possible, and hence for the planetary constraint to be physically meaningful, is that the sub matrix $A_{11} \in R^{ne \times n1}$, have full row rank. This is determined numerically by computing the QR decomposition of $A_{11}$ to give:

$$A_{11}E = Q[R_{11} R_{12}]. \quad (7)$$

The matrix $E \in R^{n1 \times n1}$ is a permutation matrix such that the upper triangular matrix $R_{11} \in R^{ne \times ne}$ has diagonal elements that decrease in absolute magnitude down the diagonal. The rank condition is deemed numerically satisfied if:

$$|R_{11}(n_e, n_e)| > n_e n_m R_{11}(1,1), \quad (8)$$

where $n_m$ is machine epsilon. Those skilled in the art will appreciate the parentheses in Equation 8 represent a location in the matrix $n_e m_e R_{11}$, for example, the "i" location of the rows and the and "j" location within the matrix of the columns. For example, R(i,j) is the matrix element of R at the ith row and the jth column. In this case the analysis can proceed by eliminating $\theta_2$. Starting with the matrix $A_{12} \in R^{ne \times n2}$ we compute a projection operator $P \in R^{(ne-nr) \times ne}$: $PA_{12} = 0$, where $n_r$ is the rank of $A_{12}$. The projector P is computed from:

$$A_{12}^T E = Q \begin{bmatrix} R_{11} & R_{12} \\ 0 & 0 \end{bmatrix}, \quad (9)$$

where $R_{11} \in R^{nr \times nr}$ is an invertible matrix and $R_{12} \in R^{nr \times (ne-nr)}$. The matrix E is again a permutation matrix in the rank revealing QR decomposition. The desired projector is then given by:

$$P = [-R_{12}^T R_{11}^{-T} I_{n_e - n_r}] E^T. \quad (10)$$

The reduced constraint equations are now:

$$PA_{11}\theta_1 = 0. \quad (11)$$

This leaves $n_e - n_r$ equations among the $n_1$ variables in the vector $\theta_1$. Thus, it can be seen that we end up with a smaller, and potentially more efficient, system of constraint equations. In the case of the Ravigneaux transmission, the graphical model 500 based on the planetary constraint has four degrees of freedom and only two constraint equations.

The planetary constraint facilitates intuitive efficient modeling of planetary transmission systems and provides a significant improvement over the current algorithms. That is, gear sets, wheelsets, and other rotationally related physical bodies can be modeled in a graphical modeling environment through the use of a single constraint block representing constraints on a set of bodies avoiding the need to build a graphical model that includes a separate and distinct constraint block for each related pair of rotationally coupled physical elements.

While the present invention has been described with reference to an illustrative embodiment thereof, one skilled in the art will appreciate that there are changes in form and detail that may be made without departure from the intended scope of the present invention as defined in the pending claims. For example, the interface 80 can be implemented programmatically or implemented as a graphical user interface or as a command line interface or other like interface. Furthermore, those skilled in the art will appreciate that concepts discussed herein are equally applicable to time based graphical modeling environments; data flow based graphical modeling environments; discrete event based graphical modeling environments, and other like graphical modeling environments.

What is claimed is:

1. In a computational device providing a graphical modeling environment, a method for modeling a mechanical system having body elements movable in at least two dimensions, the method comprising:
   representing a first body element of mass of the mechanical system with a first block type in the graphical modeling environment, the first body element being capable of moving in at least two dimensions;
   representing a second body element of mass of the mechanical system with the first block type in the graphical modeling environment, the second body element being capable of moving in at least two dimensions;
   representing a third body element of mass of the mechanical system with the first block type in the graphical modeling environment, the third body element being capable of moving in at least two dimensions;
   representing, with a single constraint block of a second block type in the graphical modeling environment, one or more constraints having associated constraint equations between each of the first, second and third body elements relative to one another, the constraint block including a configurable number of ports; and
   simulating behavior of the mechanical system, the simulating including solving the constraint equations of the one or more constraints represented by the single constraint block to simulate behavior of the mechanical system.

2. The method of claim 1, wherein the mechanical system comprises a planetary gearset.

3. The method of claim 1, wherein the constraint block includes at least three ports, a first of the ports being associated with the first block type representing the first body element in the graphical model, a second of the ports being associated with the first block type representing the second body element, and a third of the ports being associated with the first block type representing the third body element.

4. The method of claim 1, wherein the one or more constraints comprise constraints on a degree of freedom between respective related body elements.

5. The method of claim 1, wherein the one or more constraints comprise constraints on allowed relative motions among the body elements.

6. The method of claim 5, wherein the constraints comprise kinematic constraints.

7. The method of claim 5, wherein the constraints comprise dynamic constraints.

8. The method of claim 1 further comprising:
representing a degree of freedom between two of the body elements of mass of the mechanical system with a third block type in the graphical modeling environment.

9. The method of claim 1, wherein the constraints are represented by one or more hyperedges.

10. The method of claim 1, where the restriction is modeled by a temporal constraint driver.

11. A device readable medium holding device readable instructions for modeling a mechanical system having body elements movable in at least two dimensions in a computational device providing a graphical modeling environment, the instructions comprising:
representing a first body element of mass of the mechanical system with a first block type in the graphical modeling environment, the first body element being capable of moving in at least two dimensions;
representing a second body element of mass of the mechanical system with the first block type in the graphical modeling environment, the second body element being capable of moving in at least two dimensions;
representing a third body element of mass of the mechanical system with the first block type in the graphical modeling environment, the third body element being capable of moving in at least two dimensions;
representing, with a single constraint block of a second block type, one or more constraints having associated constraint equations between each of the first, second and third body elements relative to one another, the constraint block including a configurable number of ports; and
simulating behavior of the mechanical system, the simulating including solving the constraint equations of the one or more constraints represented by the single constraint block to simulate behavior of the mechanical system.

12. The device readable medium of claim 11, wherein the mechanical system comprises a planetary gearset.

13. The device readable medium of claim 11, wherein the constraint block includes at least three ports, a first of the ports being associated with the first block type representing the first body element in the graphical model, a second of the ports being associated with the first block type representing the second body element, and a third of the ports being associated with the first block type representing the third body element.

14. The device readable medium of claim 11, wherein the one or more constraints comprise constraints on degrees of freedom between respective related body elements.

15. The device readable medium of claim 11, wherein the one or more constraints comprise constraints on allowed relative motions among the body elements.

16. The device readable medium of claim 15, wherein the constraints comprise kinematic constraints.

17. The device readable medium of claim 15, wherein the constraints comprise dynamic constraints.

18. The device readable medium of claim 15, wherein the constraints are represented by one or more hyperedges.

19. A computational device for use in practicing a graphical modeling environment, the graphical modeling environment for developing and performing engineering and scientific related functions, the computational device comprising,
an input device for use by a user;
a modeling facility responsive to inputs from the user for representing a first body element of mass of a mechanical system with a first block type in the graphical modeling environment, representing a second body element of mass of the mechanical system with the first block type in the graphical modeling environment, representing a third body element of mass of the mechanical system with the first block type in the graphical modeling environment, representing, with a single constraint block of a second block type in the graphical modeling environment, one or more constraints having associated constraint equations between each of the first, second and third body elements relative to one another, the first, second and third body elements each being capable of moving in at least two dimensions, the constraint block including a configurable number of ports and simulating behavior of the mechanical system, the simulating including solving the constraint equations of the one or more constraints represented by the single constrain block to simulate behavior of the mechanical system.

20. The computational device of claim 19 further comprising a display device for viewing the graphically renderable block.

21. The computational device of claim 19, wherein the mechanical system comprises a planetary gearset.

22. The computational device of claim 19, wherein the constraint block of the second block type includes at least three ports, a first of the ports being associated with the first block type representing the first body element in the graphical model, a second of the ports being associated with the first block type representing the second body element, and a third of the ports being associated with the first block type representing the third body element.

23. The computational device of claim 19, wherein the one or more constraints comprise constraints on degrees of freedom between respective related body elements.

24. The computational device of claim 19, wherein the one or more constraints comprise constraints on allowed relative motions among the body elements.

25. The computational device of claim 24, wherein the constraints comprise kinematic constraints.

26. The computational device of claim 24, wherein the constraints comprise dynamic constraints.

27. The computational device of claim 24, wherein the constraints are represented by one or more hyperedges.

28. In a computer providing a graphical modeling environment, a method for modeling a physical system, the method comprising:
selecting, using the computer, a block type representing one or more restrictions on variables between at least three elements relative to one another;
changing, using the computer, a number of ports on the selected block type;
automatically changing, using the computer, a set of constraint equations associated with the selected block type based on the change in the number of ports to reflect the change in the number of ports; and
simulating behavior of the mechanical system, the simulating including solving the set of constraint equations associated with the selected block type to simulate behavior of the physical system.

29. The method of claim 28, further comprising:
representing, using the computer, the selected block type in the model with the changed number of ports.

30. The method of claim 28, wherein the physical system comprises a mechanical system.

31. The method of claim 30, wherein the mechanical system comprises a planetary gearset.

32. The method of claim 30, wherein the one or more restrictions on the variables comprises constraints on a degree of freedom between respective related body elements of the mechanical system.

33. The method of claim 32, wherein the one or more restrictions on the variables comprises constraints on the allowed relative motions among the selected body elements.

34. The method of claim 28, wherein the restrictions comprise kinematic constraints.

35. The method of claim 28, wherein the restrictions comprise dynamic constraints.

36. A non-transitory device readable medium holding device readable instructions for modeling a physical system, the instructions comprising:
  selecting a block type representing one or more restrictions on variables between at least three elements relative to one another;
  changing a number of ports on the selected block type; and
  automatically changing a set of constraint equations associated with the selected block type based on the change in the number of ports to reflect the change in the number of ports; and
  simulating behavior of the mechanical system, the simulating including solving the set of constraint equations associated with the selected block type to simulate behavior of the physical system.

37. The medium of claim 35, further comprising:
  representing the selected block type in the model with the changed number of ports.

38. The medium of claim 36, wherein the physical system comprises a mechanical system.

39. The medium of claim 38, wherein the mechanical system comprises a planetary gearset.

40. The medium of claim 38, wherein the one or more restrictions on the variables comprises constraints on a degree of freedom between respective related body elements of the mechanical system.

41. The medium of claim 40, wherein the one or more restrictions on the degree of freedom comprises constraints on the allowed relative motions among the related body elements.

42. The medium of claim 38, wherein the restrictions comprise kinematic constraints.

43. The medium of claim 38, wherein the restrictions comprise dynamic constraints.

44. A computational device for use in practicing a graphical modeling environment, the graphical modeling environment for developing and performing engineering and scientific related functions, the computational device comprising:
  an input device for use by a user; and
  a modeling facility responsive to inputs from the user for changing a number of ports on a block type representing one or more restrictions on variables between at least three elements forming a portion of a physical system, automatically changing a set of constraint equations associated with the block type based on the change in the number of ports to reflect the change in the number of ports, the modeling facility in response to the inputs from the user changing a graphical representation of the block type to reflect the change in the number of ports and the set of constraint equations and simulating behavior of the mechanical system, the simulating including solving the set of constraint equations associated with the block type to simulate behavior of the physical system.

45. The computational device of claim 44 further comprising, a display device for viewing the graphically renderable block.

46. The computational device of claim 44, wherein the physical system comprises a mechanical system.

47. The computational device of claim 46, wherein the mechanical system comprises a planetary gearset.

48. The computational device of claim 46, wherein the one or more restrictions on the variables comprises constraints on a degree of freedom between respective related body elements of the mechanical system.

49. The computational device of claim 48, wherein the one or more restrictions on the body motions comprises constraints on the allowed relative motions among the related body elements.

50. The computational device of claim 49, wherein the restrictions comprise kinematic constraints.

51. The computational device of claim 49, wherein the restrictions comprise dynamic constraints.

* * * * *